(12) United States Patent
Napier et al.

(10) Patent No.: US 6,957,569 B1
(45) Date of Patent: Oct. 25, 2005

(54) DETECTION OF OIL IN TURBINE ENGINE BLEED AIR

(75) Inventors: James C. Napier, San Diego, CA (US); Wayne A. Johnson, La Jolla, CA (US); Stanley C. Mickaelian, El Cajon, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 37 days.

(21) Appl. No.: 10/826,636

(22) Filed: Apr. 15, 2004

(51) Int. Cl.[7] ............................................. G01M 15/00
(52) U.S. Cl. ....................................................... 73/116
(58) Field of Search ............................. 73/116, 117.2, 73/117.3, 117.4, 118.1, 118.2

(56) References Cited

U.S. PATENT DOCUMENTS 6,312,505 B1 * 11/2001 McQuigg et al. ............. 95/218
6,355,076 B2 * 3/2002 Gieseke et al. ............... 55/330
6,530,969 B2 * 3/2003 Gieseke et al. ............... 55/330
6,530,978 B2 * 3/2003 McQuigg et al. ............. 95/218
6,540,801 B2 * 4/2003 Gieseke et al. ............... 55/330

* cited by examiner

*Primary Examiner*—Eric S. McCall
(74) *Attorney, Agent, or Firm*—Stephen G. Mican

(57) ABSTRACT

A method of measuring the presence of oil in turbine bleed air that uses an aerosol sampler/size classifier to do a comparative measurement of the engine bleed air to the ambient air entering the engine on a real time basis by comparing quantity and size distribution of suspended particles of engine inlet air with suspended particles in the bleed air throughout the normal operating schedule of the engine and determining the presence of oil in the bleed air when the quantity and size distribution of suspended particles in the bleed air exceeds the quantity and size distribution of suspended particles in the engine inlet air by a predetermined amount.

25 Claims, 1 Drawing Sheet

DETECTION OF OIL IN TURBINE ENGINE BLEED AIR

FIELD OF THE INVENTION

The invention relates to detecting the presence of oil in turbine engine bleed air, and more particularly to aerosol analysis of turbine engine bleed air to ascertain hydrocarbon content in the engine bleed air.

BACKGROUND OF THE INVENTION

Aircraft gas turbine propulsion engines and auxiliary power units (APUs) provide cabin environmental control air from an engine air compressor. A leak in the turbine engine seal system can introduce oil in to this air. This can cause an oil smell in the cabin as well as cause cabin environmental issues. Since multiple engines supply cabin air during the aircraft operating cycle, it is difficult to diagnose the source of cabin air contamination. This may result in removal of the wrong engine and persistence of the problem.

To date, various methods of detecting oil in bleed air of turbine have been explored, including the measurement of hydrocarbon content in the air by flame ionisation detector, filter paper collection and detection with ultraviolet light, and sniff panels. None of these methods have proven to be useful in determining the presence of oil in the bleed air. The only practical method of detecting a leak in the rotor shaft seal system has been to look for evidence of oil discharging from the compressor shroud bleed slots during as-received acceptance test procedure evaluation or disassembly of the engine and inspection of seal system components.

The hydrocarbon analyser and filter paper methods have proven to be too insensitive to detect concentrations of oil that are of concern. The filter paper test has the additional disadvantage of not being a real time measurement. "Sniff panels", where a group of people smell the bleed air, have proven to be ineffective. Since oil in the bleed air is not decomposed and oxides of sulphur are not present, oil is not easily detected by this method.

SUMMARY OF THE INVENTION

The invention comprises a method of measuring the presence of oil in turbine bleed air that uses an aerosol sampler/size classifier to do a comparative measurement of the engine bleed air to the ambient air entering the engine on a real time basis. Comparison of relative quantity and size distribution of suspended particles entering the engine with suspended particles in the bleed air is made throughout the normal operating schedule of the engine. This information is used to determine if an internal engine leak is introducing oil into the bleed air. This test may be performed as an as-received evaluation of an engine removed for suspected cause of oil smell in aircraft cabin or it may be performed for an engine "on-wing", if access to a bleed air flow sample is available.

In the preferred embodiment, the invention comprises a method of detecting the presence of oil in turbine engine bleed air, comprising the steps of: sampling bleed air from the turbine engine; collecting the sampled bleed air, sampling engine inlet air near an engine air inlet for the turbine engine; measuring the mass concentration and size distribution of aerosol particles in the sampled engine inlet air with an aerosol sampler/size classifier; measuring the mass concentration and size distribution of aerosol particles in the collected sampled bleed air with the aerosol sampler/size classifier; comparing the measured mass concentration and size distribution of aerosol particles in the sampled engine inlet air with the measured mass concentration and size distribution of aerosol particles in the collected sampled bleed air; and determining that oil is present in the bleed air of the turbine engine when the measured mass concentration and size distribution of aerosol particles in the collected sampled bleed air exceeds the measured mass concentration and size distribution of aerosol particles in the sampled engine inlet air by a predetermined amount.

DETAILED DESCRIPTION OF THE INVENTION

Figure 1:
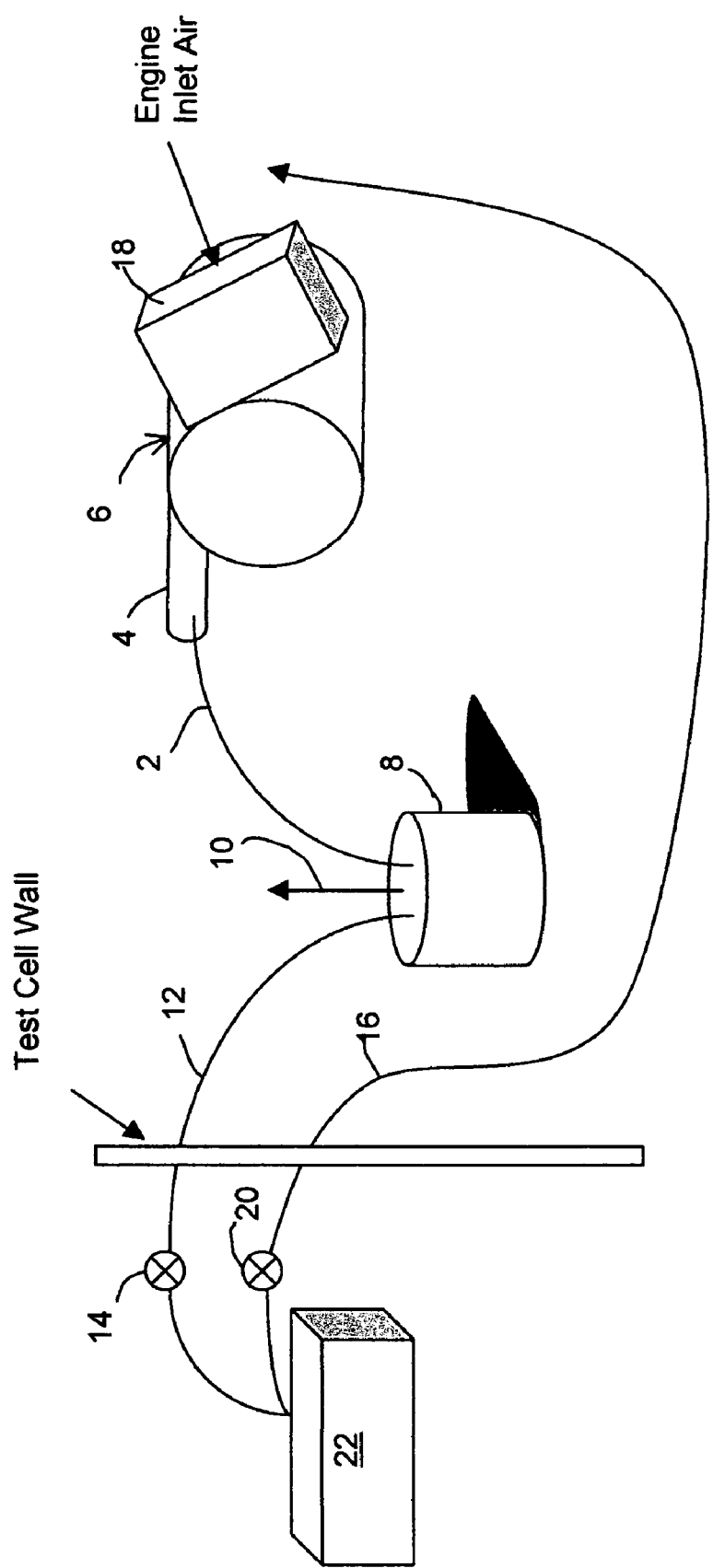
FIG. 1 is a sample system test set-up to perform the aerosol analyser method of detecting oil in turbine engine bleed air according to the invention.

The aerosol analyser method of detecting oil in turbine engine bleed air according to the invention has proven to be very sensitive to the presence of oil. Oil leaking from a turbine engine rotor shaft seal is atomised as it is centrifuged from the impeller hub. An aerosol analyser is able to detect the resulting oil particles introduced into the compressor flow. Analysers can detect individual particles ranging from less than 0.1 micron to 20 microns. This capability allows the detection of very minute quantities of oil in the compressor flow, since an aerosol is a gaseous suspension of fine particles. The method also provides real time measurement of oil in bleed air. The recent development of advanced optical laser instruments with software based control and data analysis has made this technique very effective.

FIG. 1 is a sample system test set-up to perform the aerosol analyser method of detecting oil in turbine engine bleed air according to the invention. The method may test a turbine engine in a test cell as required by an engine acceptance test procedure, including all instrumentation and controls, or "on-wing". When the engine is tested on-wing, it should be configured to allow normal operation for a continuous period of not less than approximately thirty minutes to allow the engine to warm up sufficiently.

Referring to FIG. 1, a sample line 2 couples an engine bleed duct 4 of an engine 6 under test to a sample container 8. For a typical engine 6 of the APU type, a sample line 2 of about ¼ inch diameter 0.032+/−0.005-inch wall stainless steel tube, 5 to 15 feet in length is satisfactory for this purpose. The sample container 8 is preferably of steel construction and has a volume of about one to three gallons. The sample container 8 should also have a vent 10 to atmosphere with a minimum vent area equivalent to the diameter of the sample line, in this case, a ¼ inch diameter 0.032-inch wall tube.

An instrument/bleed air sample line 12 couples the sample container 8 to an inlet of a bleed air shut-off valve 14. A shut-off valve such as a ball valve is suitable as the bleed air shut-off valve 14. The instrument/bleed air sample line is preferably the same as the sample line 2, about ¼ inch diameter 0.032+/−0.005-inch wall stainless steel tube, 5 to 15 feet in length. An engine inlet air sample line 16 should be located near an engine air inlet 18 for the engine 6 to draw air from the air source for a compressor for the engine 6 and couple the air to an inlet of an engine inlet air shut-off valve 20. A shut-off valve such as a ball valve is suitable as the engine inlet air shut-off valve 20. The engine inlet air sample line 16 is preferably the same as the sample line 2, about ¼ inch diameter 0.032+/−0.005-inch wall stainless steel tube, 5 to 15 feet in length.

Outlets of the bleed air shut-off valve 14 and engine inlet air shut-off valve 20 are coupled together and to the input of an aerosol sampler 22 with a "T" fitting 24. The aerosol sampler 22 is preferably any commercially available aerosol sampler/size classifier, such as a TSI Model 3320 Aerodynamic Particle Sizer Spectrometer with its corresponding TSI 3320 Data Reduction Software or any functionally equivalent instrument.

Prior to starting the engine 6, operation of the aerosol sampler 22 should be checked by taking particle measurements first with only the engine inlet air shut-off valve 20 open and then with only the bleed air shut-off valve 14 open. The engine 6 should then be started and loaded to nominal load expected on the aircraft. Any fluids used to clean the engine inlet 18 area, oils spilled near the engine inlet 18 area during transit if the engine 6 is being tested "off-wing" in a test cell, materials in any test cell ducting or sample line system can affect initial readings. Readings made by the aerosol sampler 22 should only be considered after they have stabilised, typically about 3 to 5 minutes following initial starting of the engine 6. To evaluate the possibility of seal malfunction on start-up, shut-down or load transient that could also show a transient increase in level, measurement should be taken after shut-down/start-up events.

The test procedure comprises a prescribed sequence of turning on only the engine inlet air shut-off valve 20 open and then only the engine bleed air shut-off valve 14 open and comparing readings made by the aerosol sampler 20 for bleed air and engine inlet air for the engine 6. Table 1 shows a suggested engine test schedule that includes a reasonable variety of samples, including shutdowns. According to one prescribed sequence, every forth sample should be of "engine inlet air" that is taken by opening only the engine inlet air shut-off valve 20. The "bleed air" samples are taken by opening only the bleed air shut-off valve 14.

The engine inlet air shut-off valve 20 and the bleed air shut-off valve 14 should be only open consecutively, never simultaneously. After the state of one of the valves 20, 14 is changed from "open" to "close", a minimum of one minute should be allowed prior to the start of the next sample. A sample time of approximately 20 seconds is recommended.

In actual tests, engine inlet levels have been observed ranging from 50 particles to 25,000 particles total within a 20 second sample time. These ambient levels reflect the presence of dust pollen and other small particles present in the ambient atmosphere. A normal engine 6 shall usually show a reduction in the number of particles in the bleed air compared to the inlet air. This is believed to be the result of small atmospheric particles being separated by the engine compressor stage.

Oil contamination in the bleed air may be determined by particle mass concentration, particle count concentration or both when these levels exceed a predetermined amount set by an established acceptance test procedure. When particle mass concentration is used as a primary method of detecting oil contaminants in turbine engine bleed air, an acceptable level of oil contamination in the bleed air of an engine 6 under test requires that after stabilisation of count level, a total bleed air particle mass is no more than 0.02 mg/M$^3$ greater than inlet air particle mass, and after restart, bleed air particle mass is no more than 0.02 mg/M$^3$ greater than inlet particle mass.

Particle mass concentration versus size and total mass of particles may be used as a primary method of detecting oil contaminants in turbine engine bleed air. Particle count concentration versus size and total particles concentration may also be used as a method for determining the presence of oil contaminants in turbine engine bleed air.

Particle mass concentration is a direct measurement of quantity of contamination. However, particle count concentration can also be applied as a more sensitive method for diagnosing the presence of oil in the bleed air, where materials are more prevalent in the smaller size range. For a given mass, the number of particles detected will be much greater in the smaller size categories.

Thus there has been described herein a method of measuring the presence of oil in turbine bleed air that uses an aerosol sampler/size classifier to do a comparative measurement of the engine bleed air to the ambient air entering the engine on a real time basis by comparing quantity and size distribution of suspended particles of engine inlet air with suspended particles in the bleed air throughout the normal operating schedule of the engine and determining the presence of oil in the bleed air when the quantity and size distribution of suspended particles in the bleed air exceeds the quantity and size distribution of suspended particles in the engine inlet air by a predetermined amount. It should be understood that the embodiment described above is only an illustrative implementation of the invention, that the various parts and arrangement thereof may be changed or substituted, and that the invention is only limited by the scope of the attached claims.

TABLE 1

SUGGESTED TEST SCHEDULE FOR OIL IN BLEED AIR

| Sample Number | Time Min.:Sec. | Source INLET (I) BLEED (B) | Load | Particle Count (Total in 20 second sample) | Total Mass (mg/M^3) and Size of max. mass concentration (microns) | Comments |
| --- | --- | --- | --- | --- | --- | --- |
| — | 0 | — | No Load | — | | Start Engine to No Load |
| 1 | 1:00 | I (Test Cell) | Standard Gen Load, Bleed to 1100F EGT | Record count here | | Load Engine |
| 2 | 2:00 | B (Engine Bleed)) | Standard Gen Load, Bleed to 1100F EGT | Record count here | | " |
| 3 | 4:00 | B | Standard Gen Load, Bleed to 1100F EGT | Record count here | | " |

TABLE 1-continued

SUGGESTED TEST SCHEDULE FOR OIL IN BLEED AIR

| Sample Number | Time Min.:Sec. | Source INLET (I) BLEED (B) | Load | Particle Count (Total in 20 second sample) | Total Mass (mg/M^3) and Size of max. mass concentration (microns) | Comments |
|---|---|---|---|---|---|---|
| 4 | 6:00 | B | Standard Gen Load, Bleed to 1100F EGT | Record count here | | " |
| 5 | 8:00 | I | Standard Gen Load, Bleed to Max. EGT | Record count here | | " |
| 6 | 10:00 | B | Standard Gen Load, Bleed to Max. EGT | Record count here | | " |
| 7 | 12:00 | B | Standard Gen Load, Bleed to Max. EGT | Record count here | | " |
| 8 | 14:00 | B | Standard Gen Load, Bleed to Max. EGT | Record count here | | " |
| | 16:00 | | | | | Unload and shutdown for 10 minutes minimum |
| — | 26:00 | — | No Load | — | | Start Engine to No Load |
| 9 | 27:00 | I | Standard Gen Load, Bleed to 1100F EGT | Record count here | | Load Engine |
| 10 | 29:00 | B | Standard Gen Load, Bleed to 1100F EGT | Record count here | | " |
| 11 | 31:00 | B | Standard Gen Load, Bleed to 1100F EGT | Record count here | | " |
| 12 | 33:00 | B | Standard Gen Load, Bleed to 1100F EGT | Record count here | | " |
| 13 | 35:00 | I | Standard Gen Load, Bleed to Max. EGT | Record count here | | " |
| 14 | 37:00 | B | Standard Gen Load, Bleed to Max. EGT | Record count here | | " |
| 15 | 39:00 | B | Standard Gen Load, Bleed to Max. EGT | Record count here | | " |
| 16 | 41:00 | B | Standard Gen Load, Bleed to Max. EGT | Record count here | | " |
| 17 | 43:00 | I | Standard Gen Load, Bleed to Max. EGT | Record count here | | " |
| | | | | | | Unload and shutdown |

What is claimed is:

1. A method of detecting the presence of oil in turbine engine bleed air, comprising the steps of:
   sampling bleed air from the engine;
   collecting the sampled bleed air;
   sampling engine inlet air for the engine;
   measuring the mass concentration and size distribution of aerosol particles in the sampled engine inlet air with an aerosol sampler/size classifier;
   measuring the mass concentration and size distribution of aerosol particles in the collected sampled bleed air with the aerosol sampler/size classifier;
   comparing the measured mass concentration and size distribution of aerosol particles in the sampled engine inlet air with the measured mass concentration and size distribution of aerosol particles in the collected sampled bleed air; and
   determining that oil is present in the bleed air of the engine when the measured mass concentration and size distribution of aerosol particles in the collected sampled bleed air exceeds the measured mass concentration and size distribution of aerosol particles in the sampled engine inlet air by a predetermined amount.

2. The method of claim 1, wherein the step of sampling bleed air comprises sampling bleed air from an engine bleed duct of the engine.

3. The method of claim 1, wherein the step of collecting the sampled bleed air comprises collecting the bleed air in a vented sample container.

4. The method of claim 1, wherein the step of sampling engine inlet air comprises sampling engine inlet air near an engine air inlet for the engine.

5. The method of claim 1, wherein the steps of measuring the mass concentration and size distribution of aerosol particles in the sampled engine inlet air and collected sampled bleed air are made consecutively.

6. The method of claim 5, wherein the step of measuring the mass concentration and size distribution of aerosol particles in the collected sampled bleed air comprises measuring a plurality of consecutive samples of collected bleed air for each measurement of sampled engine inlet air.

7. The method of claim 6, wherein the step of comparing comprises comparing the measured mass concentration and size distribution of aerosol particles in each of the plurality of consecutive samples of collected bleed air with the measured mass concentration and size distribution of aerosol particles in the immediately preceding sample of engine inlet air.

8. The method of claim 1, wherein the step of determining that oil is present in the bleed air of the engine when the measured particle count concentration of aerosol particles in the collected sampled bleed air exceeds the particle count concentration of aerosol particles in the sampled engine inlet air by a predetermined amount.

9. The method of claim 1, wherein the step of determining that oil is present in the bleed air of the engine comprises selecting a predetermined amount of mass concentration of aerosol particles in the collected sampled bleed air that exceeds the measured mass concentration of aerosol particles in the sampled engine inlet air by a predetermined amount.

10. The method of claim 9, wherein the step of determining that oil is present in the bleed air of the engine comprises selecting a predetermined amount of mass concentration of aerosol particles in the collected sampled bleed air that exceeds the measured mass concentration of aerosol particles in the sampled engine inlet air by approximately 0.02 mg/M$^3$.

11. The method of claim 1, wherein the engine is tested in a test cell.

12. The method of claim 1, wherein the engine is tested on board an aircraft.

13. A method of detecting the presence of oil in turbine engine bleed air, comprising the steps of:
sampling bleed air from an engine bleed duct of the engine;
collecting the sampled bleed air in a vented sample container;
sampling engine inlet air near an engine air inlet for the engine;
consecutively measuring the mass concentration and size distribution of aerosol particles in the sampled engine inlet air and in the collected sampled bleed air with a aerosol sampler/size classifier;
comparing the measured mass concentration and size distribution of aerosol particles in the sampled engine inlet air with the measured mass concentration and size distribution of aerosol particles in the collected sampled bleed air; and
determining that oil is present in the bleed air of the engine when the measured mass concentration and size distribution of aerosol particles in the collected sampled bleed air exceeds the measured mass concentration and size distribution of aerosol particles in the sampled engine inlet air by a predetermined amount.

14. The method of claim 13, wherein the step of consecutively measuring the mass concentration and size distribution of aerosol particles in the sampled engine inlet air and in the collected sampled bleed air comprises measuring a plurality of consecutive samples of collected bleed air for each measurement of sampled engine inlet air.

15. The method of claim 14, wherein the step of comparing comprises comparing the measured mass concentration and size distribution of aerosol particles in each of the plurality of consecutive samples of collected bleed air with the measured mass concentration and size distribution of aerosol particles in the immediately preceding sample of engine inlet air.

16. The method of claim 13, wherein the step of determining that oil is present in the bleed air of the engine when the measured particle count concentration of aerosol particles in the collected sampled bleed air exceeds the particle count concentration of aerosol particles in the sampled engine inlet air by a predetermined amount.

17. The method of claim 13, wherein the step of determining that oil is present in the bleed air of the engine comprises selecting a predetermined amount of mass concentration of aerosol particles in the collected sampled bleed air that exceeds the measured mass concentration of aerosol particles in the sampled engine inlet air by a predetermined amount.

18. The method of claim 17, wherein the step of determining that oil is present in the bleed air of the engine comprises selecting a predetermined amount of mass concentration of aerosol particles in the collected sampled bleed air that exceeds the measured mass concentration of aerosol particles in the sampled engine inlet air by approximately 0.02 mg/M$^3$.

19. The method of claim 13, wherein the engine is tested in a test cell.

20. The method of claim 13, wherein the engine is tested on board an aircraft.

21. A method of detecting the presence of oil in turbine engine bleed air, comprising the steps of:
sampling bleed air from an engine bleed duct of the engine;
collecting the sampled bleed air in a vented sample container;
sampling engine inlet air near an engine air inlet for the engine;
consecutively measuring the mass concentration and size distribution of aerosol particles in the sampled engine inlet air and in the collected sampled bleed air with a aerosol sampler/size classifier;
comparing the measured mass concentration and size distribution of aerosol particles in the sampled engine inlet air with the measured mass concentration and size distribution of aerosol particles in the collected sampled bleed air; and
determining that oil is present in the bleed air of the engine when the measured mass concentration of aerosol particles in the collected sampled bleed air exceeds the measured mass concentration of aerosol particles in the sampled engine inlet air by approximately 0.02 mg/M$^3$.

22. The method of claim 21, wherein the step of consecutively measuring the mass concentration and size distribution of aerosol particles in the sampled engine inlet air and in the collected sampled bleed air comprises measuring a plurality of consecutive samples of collected bleed air for each measurement of sampled engine inlet air.

23. The method of claim 21, wherein the step of comparing comprises comparing the measured mass concentration and size distribution of aerosol particles in each of the plurality of consecutive samples of collected bleed air with the measured mass concentration and size distribution of aerosol particles in the immediately preceding sample of engine inlet air.

24. The method of claim 21, wherein the engine is tested in a test cell.

25. The method of claim 21, wherein the engine is tested on board an aircraft.

* * * * *